US009292802B2

(12) United States Patent
Arakawa (10) Patent No.: US 9,292,802 B2
(45) Date of Patent: Mar. 22, 2016

(54) CLIENT APPARATUS CONFIGURED TO COMMUNICATE WITH DEVICE AND SERVER VIA NETWORK

(75) Inventor: Eiji Arakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 2397 days.

(21) Appl. No.: 12/052,615

(22) Filed: Mar. 20, 2008

(65) Prior Publication Data

US 2008/0243649 A1 Oct. 2, 2008

(30) Foreign Application Priority Data

Mar. 28, 2007 (JP) .................................. 2007-085798

(51) Int. Cl.
*G06Q 30/00* (2012.01)
*G06Q 10/00* (2012.01)
*G06Q 10/08* (2012.01)
*H04L 29/08* (2006.01)

(52) U.S. Cl.
CPC .............. *G06Q 10/00* (2013.01); *G06Q 10/087* (2013.01); *H04L 67/125* (2013.01)

(58) Field of Classification Search
CPC ........................ H04L 2463/081; G06Q 50/00
USPC ............. 705/26, 29, 34, 26.35; 709/203, 223, 709/224; 718/104
See application file for complete search history.

(56) References Cited

U.S. PATENT DOCUMENTS 6,654,726 B1 * 11/2003 Hanzek ......................... 705/26.5
7,124,097 B2 * 10/2006 Claremont et al. ........ 705/26.81
7,426,482 B2 9/2008 Inami et al.
(Continued)

FOREIGN PATENT DOCUMENTS

JP H11-338323 A 12/1999
JP 2000-181829 A 6/2000
(Continued)

OTHER PUBLICATIONS

Japanese Patent Office; Office Action in Japanese Patent Application No. 2007-085798 mailed Dec. 24, 2008.
(Continued)

*Primary Examiner* — Robert R Niquette
*Assistant Examiner* — Rokib Masud
(74) *Attorney, Agent, or Firm* — Baker Botts L.L.P.

(57) ABSTRACT

A client apparatus is configured to communicate with a device and with a server via a network. A status-information acquiring portion acquires, from the device, status information indicative of status of the device. A requesting portion makes a predetermined request to the server based on the status information. A request-status-information acquiring portion acquires, from the device, request status information indicative of a request status of the predetermined request. A determining portion determines whether the predetermined request is already made to the server, based on the request status information acquired by the request-status-information acquiring portion. A request controlling portion determines that the predetermined request should be made to the server, if the determining portion determines that the predetermined request is not yet made. An instructing portion instructs the device to set the request status information to a requested state, if the request controlling portion determines that the predetermined request should be made.

12 Claims, 5 Drawing Sheets

(56) References Cited

U.S. PATENT DOCUMENTS

| | | | |
|---|---|---|---|
| 2001/0004734 A1 | 6/2001 | Kudoh et al. | |
| 2006/0161658 A1 | 7/2006 | Noguchi | |

FOREIGN PATENT DOCUMENTS

| | | |
|---|---|---|
| JP | 2001-175719 A | 6/2001 |
| JP | 2002-064671 A | 2/2002 |
| JP | 2003-063104 A | 3/2003 |
| JP | 2004-234650 A | 8/2004 |
| JP | 200525359 A | 1/2005 |
| JP | 2005059303 A | 3/2005 |
| JP | 2007-052570 A | 3/2007 |

OTHER PUBLICATIONS

Japan Patent Office; Office Action in Japanese Patent Application No. 2007-085798 mailed Jul. 21, 2009.

* cited by examiner

CLIENT APPARATUS CONFIGURED TO COMMUNICATE WITH DEVICE AND SERVER VIA NETWORK

CROSS REFERENCE TO RELATED APPLICATIONS

This application claims priority from Japanese Patent Application No. 2007-85798 filed Mar. 28, 2007. The entire content of the priority application is incorporated herein by reference.

TECHNICAL FIELD

The invention relates to a client apparatus, a device, a network system, and a storage medium storing a computer program executable on a client apparatus.

BACKGROUND

Conventionally, a system is well known in which a single device such as a printer, scanner, facsimile device, or multi-function device is commonly used by a plurality of personal computers (client apparatuses) which are connected to the single device via a local area network.

Further, Japanese Patent Application Publication 2005-59303 (paragraph 0009) discloses technology where a user transmits information relating to a consumable to a service providing device, and receives screen information that provides a service in accordance with the information relating to the consumable, thereby enabling the user to request a necessary service from the screen.

SUMMARY

However, if the above-described conventional system is applied to the technology disclosed in Japanese Patent Application Publication 2005-59303, each of the client apparatuses can request the service. For example, even if one of the client apparatuses has already ordered a consumable for a device, another client apparatus may order the same consumable for the device. This leads to a problem of multiple ordering and purchasing consumables and a problem of wasting resources of network traffic and a server that receives orders for consumables.

In another example, when a new device is purchased, a user registration is requested to a server from a client apparatus. In this case, even if one of a plurality of client apparatuses has already requested a user registration for the device, another client apparatus may request another user registration for the same device. This also leads to a problem of making multiple user registrations and a problem of wasting resources of network traffic and the server that performs user registrations.

In view of the foregoing, it is an object of the invention to provide a client apparatus, a device, a network system, and a storage medium storing a computer program executable on a client apparatus, which are capable of preventing multiple orders of consumables, multiple user registrations, and the like.

In order to attain the above and other objects, the invention provides a client apparatus configured to communicate with a device and with a server via network. The client apparatus includes a status-information acquiring portion, a requesting portion, a request-status-information acquiring portion, a determining portion, a request controlling portion, and an instructing portion. The status-information acquiring portion acquires, from the device, status information indicative of status of the device. The requesting portion makes a predetermined request to the server based on the status information. The request-status-information acquiring portion acquires, from the device, request status information indicative of a request status of the predetermined request. The determining portion determines whether the predetermined request is already made to the server, based on the request status information acquired by the request-status-information acquiring portion. The request controlling portion determines that the predetermined request should be made to the server, if the determining portion determines that the predetermined request is not yet made. The instructing portion instructs the device to set the request status information to a requested state, if the request controlling portion determines that the predetermined request should be made.

According to another aspect, the invention provides a client apparatus configured to communicate with a device and with a server via network. The client apparatus includes a requesting portion, a request-status-information acquiring portion, a determining portion, a request controlling portion, and an instructing portion. The requesting portion makes a user registration request, to the server, for registering both device identification information identifying the device and user identification information identifying a user that uses the device. The request-status-information acquiring portion acquires, from the device, request status information indicative of a request status of the user registration request. The determining portion determines whether the user registration request is already made to the server, based on the request status information acquired by the request-status-information acquiring portion. The request controlling portion determines that the user registration request should be made to the server, if the determining portion determines that the user registration request is not yet made. The instructing portion instructs the device to set the request status information to a requested state, if the request controlling portion determines that the user registration request should be made.

According to still another aspect, the invention provides a device configured to communicate with a plurality of client apparatuses and with a server via network. The device includes a first storing portion, a first transmitting portion, and a first setting portion. The first storing portion stores request status information indicative of a request status of a predetermined request. The first transmitting portion, in accordance with a request from one of the plurality of client apparatuses, transmits the request status information to the one of the plurality of client apparatuses. The first setting portion sets the request status information to a requested state in accordance with instruction from the one of the plurality of client apparatuses.

According to still another aspect, the invention provides a network system including a plurality of client apparatuses and a device, each of which configured to communicate with one another and with a server via network. Each of the plurality of client apparatuses includes a status-information acquiring portion, a requesting portion, a request-status-information acquiring portion, a determining portion, a request controlling portion, and an instructing portion. The status-information acquiring portion acquires, from the device, status information indicative of status of the device. The requesting portion makes a predetermined request to the server based on the status information. The request-status-information acquiring portion acquires, from the device, request status information indicative of a request status of the predetermined request. The determining portion determines whether the predetermined request is already made to the server, based on the request status information acquired by the requeststatus-information acquiring portion. The request controlling portion determines that the predetermined request should be made to the server, if the determining portion determines that the predetermined request is not yet made. The instructing portion instructs the device to set the request status information to a requested state, if the request controlling portion determines that the predetermined request should be made. The device includes a storing portion, a transmitting portion, and a setting portion. The storing portion stores the request status information. The transmitting portion, in accordance with a request from the request-status-information acquiring portion of one of the plurality of client apparatuses, transmits the request status information to the one of the plurality of client apparatuses. The setting portion sets the request status information to a requested state in accordance with instruction from the instructing portion of the one of the plurality of client apparatuses.

According to still another aspect, the invention provides a storage medium storing a set of program instructions executable on a client apparatus configured to communicate with a device and with a server via network. The set of program instructions includes: acquiring, from the device, status information indicative of status of the device; making a predetermined request to the server based on the status information; acquiring, from the device, request status information indicative of a request status of the predetermined request; determining whether the predetermined request is already made to the server, based on the request status information; determining that the predetermined request should be made to the server, if the predetermined request is not yet made; and instructing the device to set the request status information to a requested state, if it is determined that the predetermined request should be made.

According to still another aspect, the invention provides a storage medium storing a set of program instructions executable on a client apparatus configured to communicate with a device and with a server via network. The set of program instructions includes: making a user registration request, to the server, for registering both device identification information identifying the device and user identification information identifying a user that uses the device; acquiring, from the device, request status information indicative of a request status of the user registration request; determining whether the user registration request is already made to the server, based on the request status information; determining that the user registration request should be made to the server, if the user registration request is not yet made; and instructing the device to set the request status information to a requested state, if it is determined that the user registration request should be made.

BRIEF DESCRIPTION OF THE DRAWINGS

Embodiments in accordance with the invention will be described in detail with reference to the following figures wherein.

DETAILED DESCRIPTION

A client apparatus, a device, a network system, and a storage medium storing a computer program executable on a client apparatus according to an embodiment of the invention will be described while referring to FIGS. 1 through 5B.

Figure 1:
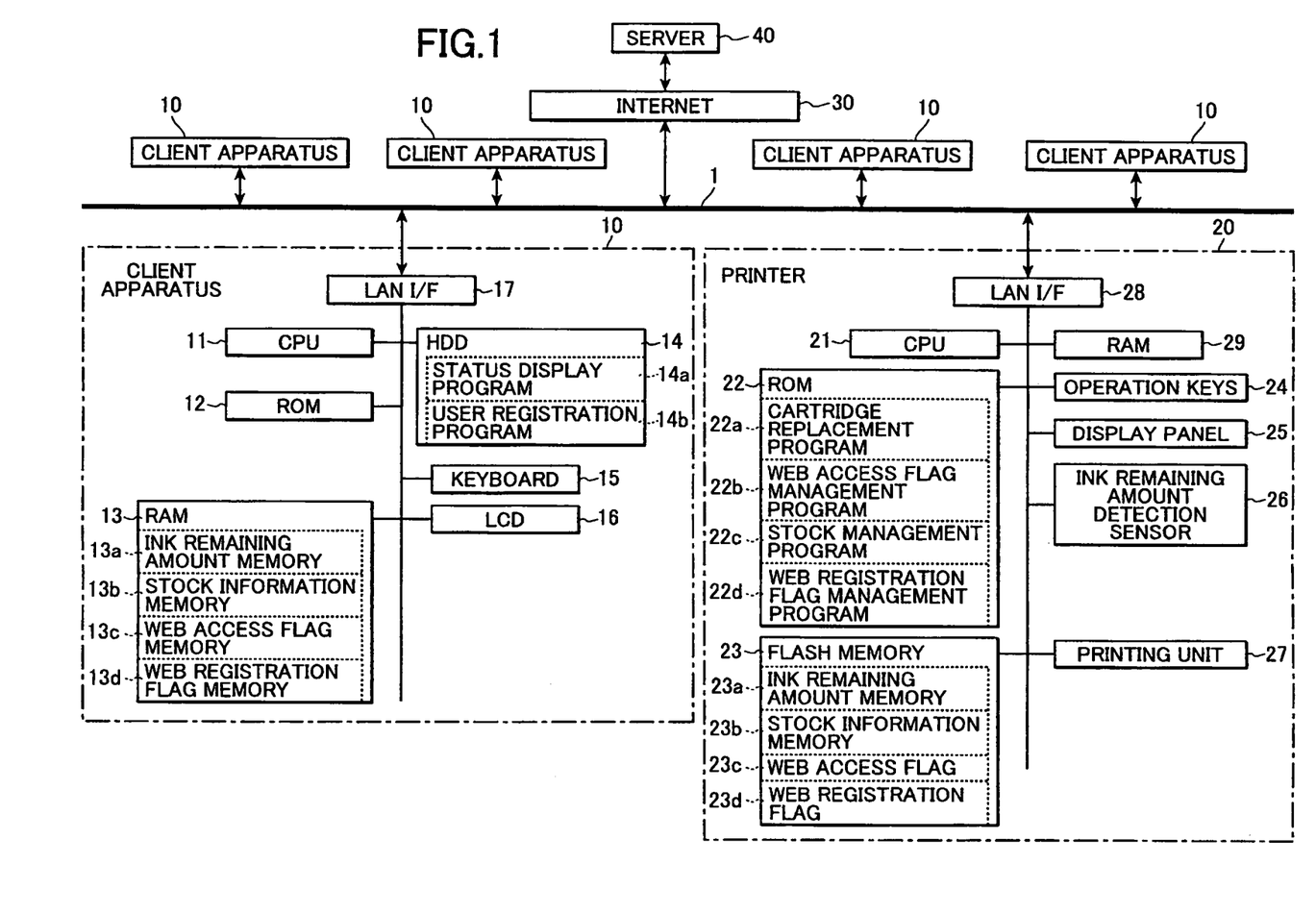
FIG. 1 is a block diagram showing an electrical configuration of a network system according to an embodiment of the invention.

FIG. 1 is a block diagram showing an electrical configuration of a network system including client apparatuses 10 and a printer 20 (an example of a device) according to the embodiment. FIG. 1 illustrates detailed electrical configuration for one of the five client apparatuses 10, while each of the other client apparatuses 10 has the same configuration and thus detailed descriptions thereof are omitted.

In the network system, the five client apparatuses 10 and the single printer 20 are connected with one another via a local area network (LAN) cable 1. Each of the client apparatuses 10 shares the single printer 20.

Each client apparatus 10 is configured to communicate with a server 40 via an Internet 30. Each client apparatus 10 is capable of making orders of ink cartridges used in the printer 20 to the server 40 via the Internet 30, and is also capable of making a request for user registration for the printer 20 to the server 40 via the Internet 30. Especially, each client apparatus 10 in the network system can prevent multiple orders of ink cartridges (example of consumables) and multiple user registrations.

Each client apparatus 10 is configured as a general personal computer, and includes a CPU 11, a ROM 12, a RAM 13, a hard disk drive (HDD) 14, a keyboard 15, a liquid crystal display (LCD) 16, and a LAN interface (LAN I/F) 17.

The CPU 11 is a processing unit for executing programs stored in the ROM 12 and RAM 13. The ROM 12 is a non-rewritable memory for storing basic programs such as a boot program.

The RAM 13 is a rewritable memory and includes an ink remaining amount memory 13a, a stock information memory 13b, a Web access flag memory 13c, and a Web registration flag memory 13d. The ink remaining amount memory 13a is a memory area for temporarily storing an ink remaining amount which is acquired from the printer 20. The stock information memory 13b is a memory area for temporarily storing the number of ink cartridges for the printer 20 in stock, which is acquired from the printer 20. The Web access flag memory 13c is a memory area for temporarily storing a setting status of a Web access flag 23c which is acquired from the printer 20. The Web registration flag memory 13d is a memory area for temporarily storing a setting status of a Web registration flag 23d which is acquired from the printer 20.

The HDD 14 is a rewritable storage device for storing an operating system and various application programs executed on the client apparatus 10. In the present embodiment, the HDD 14 stores a status display program 14a and a user registration program 14b.

Figure 2:
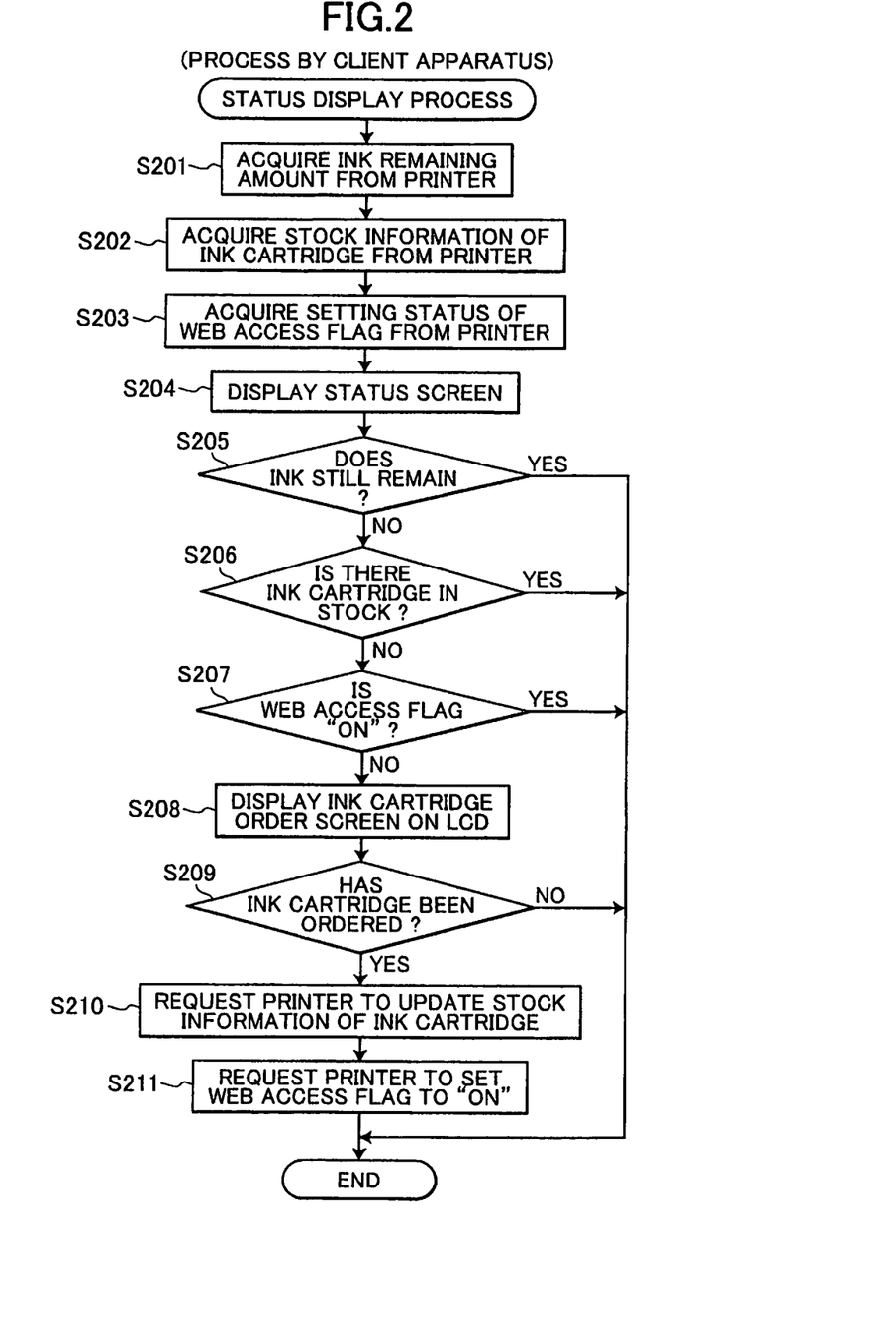
FIG. 2 is a flowchart showing a status display process according to the embodiment.
Figure 4:
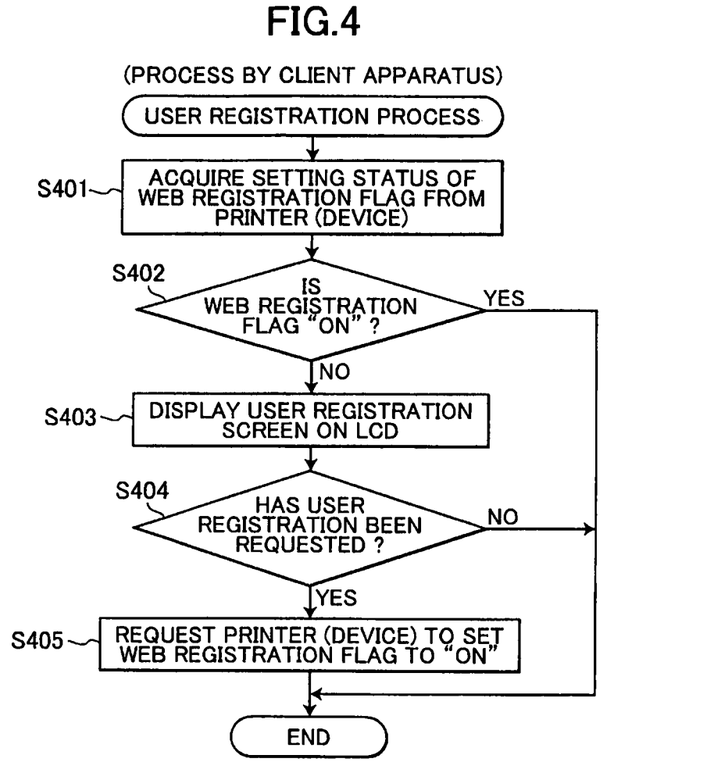
FIG. 4 is a flowchart showing a user registration process according to the embodiment.

The status display program 14a is a program for executing a status display process shown in FIG. 2, while the user registration program 14b is a program for executing a user registration process shown in FIG. 4. The HDD 14 also stores a browser for displaying Web pages transmitted from the server 40 on the LCD 16 and a printer driver for controlling the printer 20.

The keyboard 15 is an inputting device for inputting operations performed by a user. The LCD 16 is a display device for displaying texts, figures, icons, and the like. The LCD 16 displays an ink cartridge order screen 50 shown in FIG. 5A and a user registration screen 55 shown in FIG. 5B. The LAN I/F 17 is an interface for transmitting data to and receiving data from each device connected to the LAN cable 1.

The printer 20 is a so-called inkjet type printer having an inkjet head that ejects, on a recording medium, ink droplets supplied from an ink cartridge filled with black ink, thereby forming a monochrome image on the recording medium.

The printer 20 includes a CPU 21, a ROM 22, a flash memory 23, a RAM 29, operation keys 24, a display panel 25, an ink remaining amount detection sensor 26, a printing unit 27, and a LAN I/F 28.

The CPU 21 is a processing unit for executing programs stored in the ROM 22. The ROM 22 is a non-rewritable memory for storing various programs for controlling the printer 20. These programs include a cartridge replacement program 22a, a Web access flag management program 22b, a stock management program 22c, and a Web registration flag management program 22d.

Figure 3:
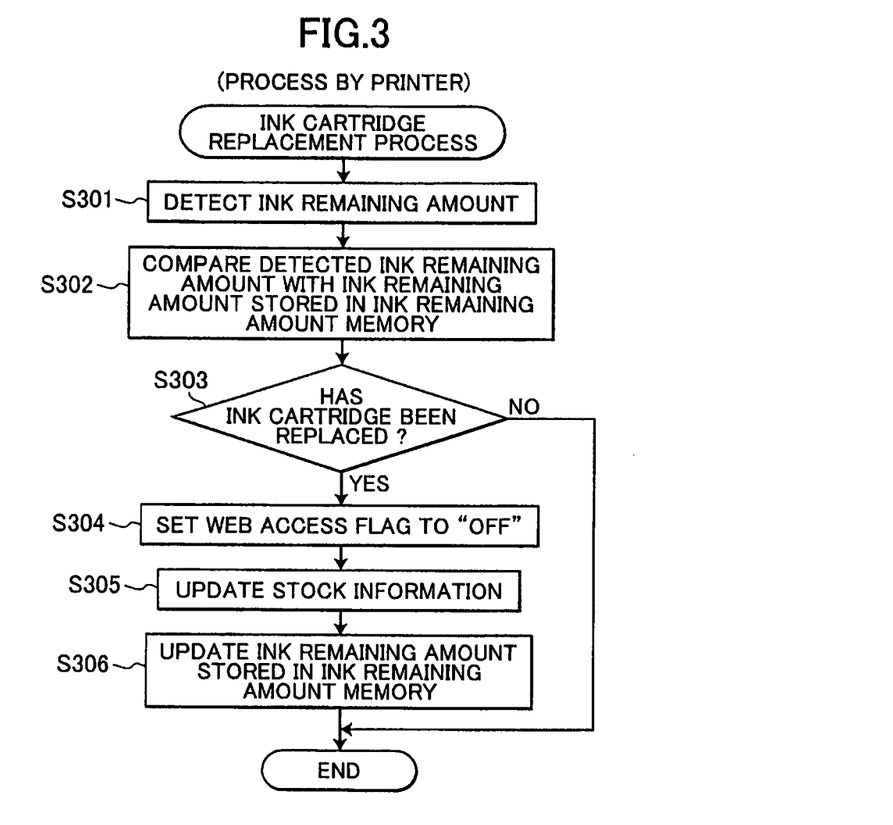
FIG. 3 is a flowchart showing a cartridge replacement process according to the embodiment.

The cartridge replacement program 22a is a program for executing a cartridge replacement process shown in FIG. 3. The Web access flag management program 22b is a program for managing settings of the Web access flag 23c described later. In the status display process of FIG. 2, the Web access flag management program 22b sets the Web access flag 23c to "ON" when the client apparatus 10 has made a request for setting the Web access flag 23c to "ON".

The stock management program 22c is a program for managing the number of ink cartridges in stock stored in a stock information memory 23b described later. In the status display process of FIG. 2, the stock management program 22c updates the number of ink cartridges in stock stored in the stock information memory 23b when the client apparatus 10 has made a request for updating the number of ink cartridges in stock.

The Web registration flag management program 22d is a program for managing settings of the Web registration flag 23d described later. In the user registration process of FIG. 4, the Web registration flag management program 22d sets the Web registration flag 23d to "ON" when the client apparatus 10 has made a request for setting the Web registration flag 23d to "ON".

The flash memory 23 is a rewritable and non-volatile memory and keeps data even after the power of the printer 20 is turned off. The flash memory 23 includes an ink remaining amount memory 23a, the stock information memory 23b, the Web access flag 23c, and the Web registration flag 23d.

The ink remaining amount memory 23a is a memory area for storing an ink remaining amount in an ink cartridge which is detected by the ink remaining amount detection sensor 26 described later in the cartridge replacement process of FIG. 3. The stock information memory 23b is a memory area for storing the number of ink cartridges in stock.

The Web access flag 23c is a flag that indicates whether an ink cartridge has been ordered. The Web access flag 23c is set to "ON" when an ink cartridge has been ordered in the status display process of FIG. 2, while the Web access flag 23c is set to "OFF" when an ink cartridge has been replaced in the cartridge replacement process of FIG. 3.

The Web registration flag 23d is a flag that indicates whether user registration has been requested. The Web registration flag 23d is set to "OFF" when the printer 20 is shipped from a factory. When one of the client apparatuses 10 requests user registration to the server 40 in the user registration process of FIG. 4, the Web registration flag 23d is set to "ON" for indicating that user registration has been requested.

The operation keys 24 are an inputting device for operating the printer 20. The display panel 25 is a display device that displays texts, figures, icons, and the like. The ink remaining amount detection sensor 26 is a sensor that detects an ink remaining amount of the ink cartridge mounted on the printer 20. The printing unit 27 is for performing printing on a recording medium and for conveying the recording medium on which printing has been performed. The LAN I/F 28 is an interface for transmitting data to and receiving data from each device connected to the LAN cable 1.

The status display process is described while referring to the flowchart in FIG. 2. The status display process is periodically executed in the client apparatus 10 according to the status display program 14a. The status display process is a process for displaying, on the LCD 16, an ink remaining amount and the number of ink cartridges in stock, as status information indicative of status of the printer 20.

In this process, in S201 the CPU 11 acquires an ink remaining amount from the printer 20. More specifically, the CPU 11 acquires the ink remaining amount stored in the ink remaining amount memory 23a of the printer 20, and temporarily stores the acquired ink remaining amount in the ink remaining amount memory 13a of the client apparatus 10.

In S202 the CPU 11 acquires stock information of ink cartridges from the printer 20. More specifically, the CPU 11 acquires the number of ink cartridges in stock that is stored in the stock information memory 23b of the printer 20, and temporarily stores the acquired number of ink cartridges in stock in the stock information memory 13b of the client apparatus 10.

In S203 the CPU 11 acquires setting status of the Web access flag 23c from the printer 20. More specifically, the CPU 11 acquires information of whether the Web access flag 23c is set to "ON" (indicating that one or more ink cartridge has already been ordered) or set to "OFF" (indicating that no ink cartridge has been ordered yet), and temporarily stores the acquired information in the Web access flag memory 13c of the client apparatus 10.

In S204 the CPU 11 displays a status screen on the LCD 16. In the present embodiment, the CPU 11 displays on the LCD 16 the ink remaining amount acquired in S201 and the number of ink cartridges in stock acquired in S202 as status information of the printer 20. However, the status information is not limited to such information and a type of a recording medium set in the printer 20, a print quality, or the like may be displayed as the status information.

In S205 the CPU 11 determines whether ink still remains in the ink cartridge currently mounted on the printer 20. If no ink remains or ink remaining amount is zero (S205: No), in S206 the CPU 11 determines whether there is one or more ink cartridge in stock. If there is no ink cartridge in stock (S206: No), in S207 the CPU 11 determines whether the Web access flag acquired in S203 is "ON" (whether at least one ink cartridge has been ordered). If the Web access flag is "OFF", indicating that no ink cartridge has been ordered yet (S207: No), then in S208 the CPU 11 displays an ink cartridge order screen on the LCD 16.

Figure 5A:
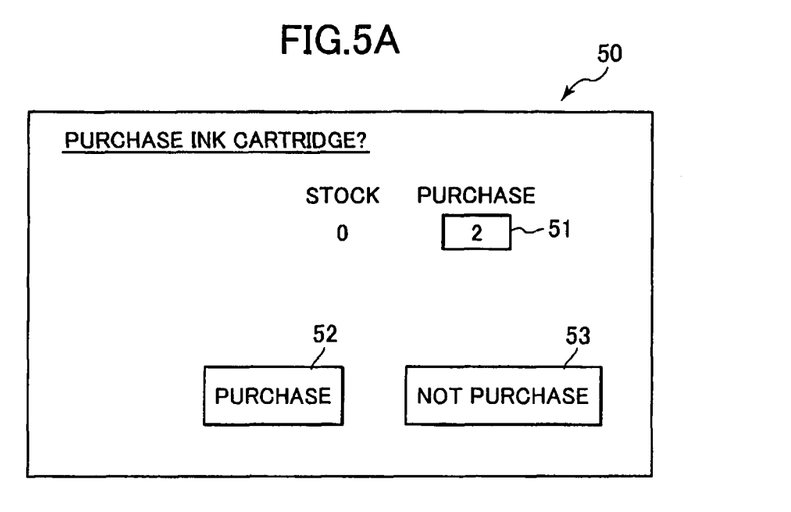
FIG. 5A shows an order screen displayed on a liquid crystal display (LCD) for ordering ink cartridges.

FIG. 5A shows an ink cartridge order screen 50 which is displayed on the LCD 16 in S208. The ink cartridge order screen 50 is a screen for making an order of one or more ink cartridge to the server 40 via the Internet 30.

As shown in FIG. 5A, the ink cartridge order screen 50 displays texts "PURCHASE INK CARTRIDGES?", the current number of ink cartridges in stock ("0" in the present embodiment), a number-of-purchase input box 51, a purchase button 52 displaying texts "PURCHASE", and a not-purchase button 53 displaying texts "NOT PURCHASE".

If a user of the client apparatus 10 wishes to order one or more ink cartridge from the ink cartridge order screen 50, the user can operates the keyboard 15 to input the number of ink cartridges to be purchased ("2" in the present embodiment) in the number-of-purchase input box 51 and then to select the purchase button 52. The ink cartridge order screen 50 is linked with the server 40. Hence, when the number-of-purchase input box 51 is selected, the number of order inputted in the number-of-purchase input box 51 is transmitted to the server 40 and the order of ink cartridge is completed.

Returning to FIG. 2, in S208 the CPU 11 displays the ink cartridge order screen 50 of FIG. 5A on the LCD 16. In S209 the CPU 11 determines whether one or more ink cartridge has been ordered. That is, the CPU 11 determines whether the purchase button 52 has been selected.

If one or more ink cartridge has been ordered (S209: Yes), then in S210 the CPU 11 notifies the printer 20 of the number of ink cartridges which have been ordered, and requests the printer 20 to update stock information of ink cartridges. In S211 the CPU 11 requests the printer 20 to set the Web access flag 23c to "ON".

The printer 20 updates the stock information of ink cartridges in the stock information memory 23b in accordance with a request made in S210. More specifically, the CPU 21 of the printer 20 adds the ordered number of ink cartridge to the number of ink cartridge currently stored in the stock information memory 23b. The printer 20 also sets the Web access flag 23c to "ON" in accordance with a request made in S211, which indicates that one or more ink cartridge has been ordered. Due to this process, management of order status and management of the number of ink cartridge in stock can be done by the printer 20. Thus, even if a plurality of client apparatuses 10 shares a single printer 20, each client apparatus 10 can check the setting status of the Web access flag 23c and the stock information of ink cartridges, thereby preventing multiple ordering of ink cartridges and wasteful ordering of ink cartridges.

If in S205 ink still remains (S205: Yes), or if in S206 there is one or more ink cartridge in stock (S206: Yes), or if in S207 the Web access flag is "ON" (S207: Yes), then the CPU 11 does not display the ink cartridge order screen 50 and ends the process. If in S209 no ink cartridge has been ordered (S209; No), then the CPU 11 skips S210 and S211 and ends the process.

In this way, according to the status display process, the ink cartridge order screen 50 is displayed such that one or more ink cartridge can be ordered, on condition that no ink remains (S205: No), that there is no ink cartridge in stock (S206: No), and that the Web access flag is "OFF" indicating that no ink cartridge has been ordered (S207: No). Hence, even if a plurality of client apparatuses 10 shares a single printer 20, multiple ordering of ink cartridges or wasteful ordering of ink cartridges can be prevented.

In other words, if ink still remains (S205: Yes), if there is one or more ink cartridge in stock (S206: Yes), or the Web access flag is "ON" indicating that one or more ink cartridge has been ordered (S207: Yes), then the ink cartridge order screen 50 is not displayed, thereby preventing the user from wastefully ordering ink cartridges. Hence, even in an environment where a plurality of client apparatuses 10 shares a single printer 20, multiple or wasteful ordering of ink cartridges can be avoided.

Since the ink remaining amount and the number of ink cartridges in stock are displayed on the LCD 16 as the status information, the user can order ink cartridges after checking the ink remaining amount and the number of ink cartridges in stock, thereby preventing wasteful ordering of ink cartridges. In addition, since the number of ink cartridges in stock is displayed on the ink cartridge order screen 50, the user can order ink cartridges while checking the number of ink cartridges in stock, thereby preventing wasteful ordering of ink cartridges.

Next, the ink cartridge replacement process will be described while referring to the flowchart in FIG. 3. The ink cartridge replacement process is periodically executed in the printer 20 according to the cartridge replacement program 22a. The ink cartridge replacement process is a process for setting the Web access flag 23c to "OFF" and for updating stock information of ink cartridges when the ink cartridge mounted on the printer 20 is replaced.

In the ink cartridge replacement process, in S301 the CPU 21 controls the ink remaining amount detection sensor 26 to detect an ink remaining amount of the ink cartridge that is currently mounted on the printer 20. In S302 the CPU 21 compares the detected ink remaining amount with an ink remaining amount stored in the ink remaining amount memory 23a.

In S303 the CPU 21 determines whether the ink cartridge has been replaced. More specifically, if the ink remaining amount detected by the ink remaining amount detection sensor 26 is greater than the ink remaining amount stored in the ink remaining amount memory 23a, then the CPU 21 determines that the ink cartridge has been replaced (S303: Yes) and in S304 the CPU 21 sets the Web access flag 23c to "OFF". Further, in S305 the CPU 21 decrements by "1" the number of ink cartridge in stock stored in the stock information memory 23b, thereby updating the number of ink cartridges in stock. In S306 the CPU 21 updates the ink remaining amount stored in the ink remaining amount memory 23a to the value of the ink remaining amount detected in S301. Then, the process ends.

According to the above-described ink cartridge replacement process, setting of the Web access flag 23c and management of ink cartridges in stock can be performed at the printer 20. Hence, even if a plurality of client apparatuses 10 shares a single printer 20, multiple ordering of ink cartridges can be prevented.

Next, the user registration process will be described while referring to the flowchart in FIG. 4. The user registration process is a process for requesting user registration to the server 40. The user registration process is executed in accordance with the user registration program 14b in the client apparatus 10, when a printer driver is installed in the client apparatus 10 or when a user makes an instruction after the printer driver is installed.

In the user registration process, in S401 the CPU 11 acquires setting status of the Web registration flag 23d from the printer 20. More specifically, the CPU 11 acquires from the printer 20 information whether the Web registration flag 23d is set to "ON" (user registration has already been requested) or the Web registration flag 23d is set to "OFF" (user registration has not been requested yet), and temporarily stores the acquired information in the Web registration flag memory 13d of the client apparatus 10.

In S402 the CPU 11 determines whether the Web registration flag is "ON" (whether user registration has already been requested). If the Web registration flag 23d is "OFF" indicating that the user registration has not been requested yet (S402: No), in S403 the CPU 11 displays a user registration screen on the LCD 16.

Figure 5B:
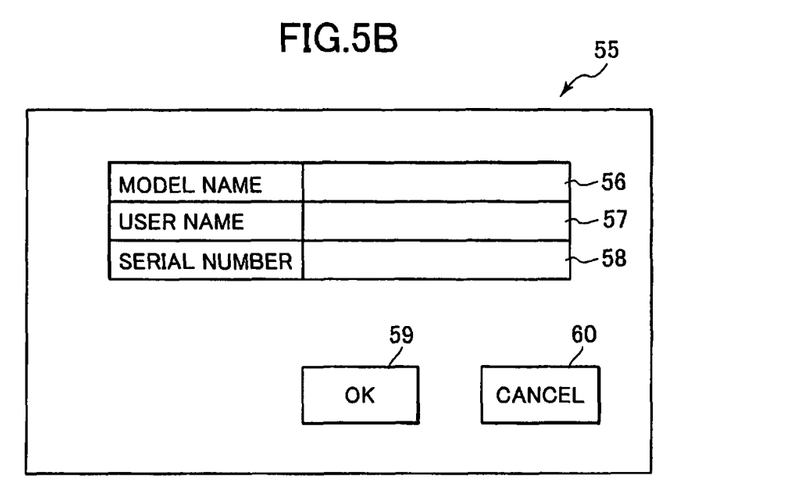
FIG. 5B shows a user registration screen displayed on the LCD for performing user registration.

FIG. 5B illustrates a user registration screen 55 that is displayed on the LCD 16 in S403. The user registration screen 55 is a screen for requesting user registration to the server 40 via the Internet 30.

As shown in FIG. 5B, the user registration screen 55 includes a model name input space 56 for inputting a model name of the printer 20, a user name input space 57 for inputting a user name for user registration, a serial number input space 58 for inputting a serial number of the printer 20, a user registration OK button 59 showing texts "OK", and a user registration cancel button 60 showing texts "CANCEL".

When a user of the client apparatus 10 requests user registration from the user registration screen 55, the user operates the keyboard 15 to input the model name, the user name, and the serial number in the model name input space 56, the user name input space 57, and the serial number input space 58, respectively, and then selects the user registration OK button 59. The user registration screen 55 is linked with the server 40. Hence, when the user registration OK button 59 is selected, the inputted model name, user name, and serial number are transmitted to the server 40. Then, a request for user registration completes.

Returning to FIG. 4, in S403 the CPU 11 displays the user registration screen 55 shown in FIG. 5B on the LCD 16. In S404 the CPU 11 determines whether user registration has been requested from the user registration screen 55, that is, whether the user registration OK button 59 has been selected. If user registration has been requested (S404: Yes), then in S405 the CPU 11 requests the printer 20 to set the Web registration flag 23d to "ON". Then, the user registration process ends.

Receiving a request made in S405, the printer 20 sets the Web registration flag 23d to "ON", which indicates that user registration has been requested. Due to this process, even if a plurality of client apparatuses 10 shares a single printer 20, multiple user registrations can be prevented by checking the setting status of the Web registration flag 23d.

Further, among information for user registration transmitted to the server 40, at least the user name is neither transmitted to the printer 20 nor the other client apparatuses 10. Thus, leaks of personal information can be prevented.

If in S402 the Web registration flag is "ON" (S402: Yes), the CPU 11 determines that user registration has already been requested, and ends the process without displaying the user registration screen 55 on the LCD 16. If in S404 user registration is not requested from the user registration screen 55 (S404: No), the CPU 11 skips S405 and ends the process.

In this way, according to the above-described user registration process, the user registration screen 55 is displayed such that user registration can be requested to the server 40, on condition that the Web registration flag 23d is "OFF" indicating that user registration has not been requested (S402: No). Hence, even if a plurality of client apparatuses 10 shares a single printer 20, multiple user registrations can be prevented.

While the invention has been described in detail with reference to the above aspects thereof, it would be apparent to those skilled in the art that various changes and modifications may be made therein without departing from the scope of the claims.

In the status display process of FIG. 2 in the above-described embodiment, the CPU 11 of the client apparatus 10 determines whether the Web access flag is "ON" if no ink remains in the ink cartridge and also there is no ink cartridge in stock. However, the client apparatus 10 may be configured such that the CPU 11 determines whether the Web access flag is "ON" if the ink remaining amount is less than a predetermined amount or the number of ink cartridges in stock is less than a predetermined number.

In the above-described embodiment, the status display process of FIG. 2 is executed at periodical timings. Instead, the status display process may be executed in accordance with a user's request at timing when the user has made a request.

In the above-described embodiment, the status display process of FIG. 2 and the cartridge replacement process of FIG. 3 are described using an example of ordering of ink cartridges. However, the invention can also be applied to a request for ordering of other consumables used in the printer 20 (recording mediums, for example), a request for repair of the printer 20, or the like.

In the above-described embodiment, a plurality of client apparatuses 10 shares a single printer 20. However, a facsimile device, a scanner device, a multifunction device, or the like may be employed instead of the printer 20, as long as the device is shared by the plurality of client apparatuses 10. Further, although the monochrome printer 20 is employed in the embodiment, a color printer may instead be employed. In this case, an ink remaining amount and the number of ink cartridges in stock may be managed for each of a plurality of colors of ink cartridges.

In the above-described embodiment, the client apparatuses 10 and the printer 20 are connected with one another with a wired LAN (LAN cable 1). However, the network is not limited to the wired LAN, and network other than a wired LAN may be employed as long as a plurality of client apparatuses and a device can be connected with one another. Examples of such network include a wireless LAN, a composite network including both wired and wireless LANs, a Bluetooth network, and the like.

In the above-described embodiment, ink cartridges are ordered from the ink cartridge order screen 50 and user registration is requested from the user registration screen 55. However, it may be configured that a predetermined number of ink cartridges are ordered automatically without displaying the ink cartridge order screen 50, provided that the conditions described in the above embodiment are satisfied (S205: No, S206: No, and S207: No in FIG. 2). Similarly, it may be configured that a model name and a serial number are automatically read out from a device and then user registration is automatically requested without displaying the user registration screen 55, provided that the condition described in the above embodiment is satisfied (S402: No in FIG. 4).

What is claimed is:

1. A client apparatus configured to communicate with a device and with a server via a network, comprising:
    a status-information acquiring portion that acquires, from the device, status information indicative of status of the device;
    a requesting portion that makes a predetermined request to the server based on the status information acquired, from the device, by the status-information acquiring portion;
    a request-status-information acquiring portion that acquires, from the device, request status information indicative of whether the predetermined request is already made to the server or not;
    a determining portion that determines whether the predetermined request is already made to the server, based on the request status information acquired by the request-status-information acquiring portion;
    a request controlling portion that instructs the requesting portion to make the predetermined request to the server without utilizing the device to make the predetermined request, if the determining portion determines that the predetermined request is not yet made, and instructs the requesting portion not to make the predetermined request to the server, if the determination portion determines that the predetermined request is already made; and
    an instructing portion that instructs the device to set the request status information to a requested state indicating that the predetermined request is already made to the server, if the request controlling portion instructs the requesting portion to make the predetermined request to the server without utilizing the device to make the predetermined request.

2. The client apparatus according to claim 1, wherein the status information is information relating to a consumable used in the device;
   wherein the predetermined request is a request for ordering the consumable; and
   wherein the request status information is indicative of whether the consumable is already ordered.

3. The client apparatus according to claim 2, wherein the status-information acquiring portion acquires, from the device, consumption information indicative of a degree of consumption of the consumable mounted on the device;
   wherein the client apparatus further comprises a degree-of-consumption determining portion that determines whether the consumable is consumed to a greater degree than a predetermined level based on the consumption information; and
   wherein the request controlling portion determines that the predetermined request should be made, on condition that the determining portion determines that the predetermined request is not yet made and that the degree-of-consumption determining portion determines that the consumable is consumed to a greater degree than the predetermined level.

4. The client apparatus according to claim 2, further comprising:
   a stock-information acquiring portion that acquires, from the device, stock information indicative of a number of the consumable in stock; and
   a stock determining portion that determines whether the number of the consumable in stock is greater than or equal to a predetermined number based on the stock information,
   wherein the request controlling portion determines that the predetermined request should be made, on condition that the determining portion determines that the predetermined request is not yet made and that the stock determining portion determines that the number of the consumable in stock is less than the predetermined number.

5. The client apparatus according to claim 2, further comprising:
   a display portion that displays predetermined information; and
   a display controlling portion that controls the display portion to display an order screen, if the determining portion determines that the predetermined request is not yet made,
   wherein the request controlling portion determines that the predetermined request should be made, on condition that the determining portion determines that the predetermined request is not yet made and that an order of the consumable is made from the order screen.

6. The client apparatus according to claim 5, wherein the status-information acquiring portion acquires, from the device, consumption information indicative of a degree of consumption of the consumable mounted on the device; and
   wherein the display controlling portion controls the display portion to display the consumption information.

7. The client apparatus according to claim 5, wherein the instructing portion notifies the device of an ordered number of the consumable if the order of the consumable is made.

8. The client apparatus according to claim 5, further comprising a stock-information acquiring portion that acquires, from the device, stock information indicative of a number of the consumable in stock,
   wherein the display controlling portion controls the display portion to display the stock information.

9. The client apparatus according to claim 8, wherein the display controlling portion controls the display portion to display the stock information on the order screen.

10. A device configured to communicate with a plurality of client apparatuses and with a server via network, comprising:
    a first storing portion that stores request status information indicative of whether a predetermined request is already made to the server or not;
    a first transmitting portion that, in accordance with a request from one of the plurality of client apparatuses, transmits the request status information stored in the first storing portion to the one of the plurality of client apparatuses; and
    a first setting portion that sets the request status information to a requested state indicating that the predetermined request is already made to the server, in accordance with an instruction from the one of the plurality of client apparatuses;
    wherein the predetermined request is a request for ordering a consumable used in the device;
    wherein the request status information is indicative of whether the consumable is already ordered;
    wherein the first setting portion sets the request status information to an ordered state in accordance with instruction from the one of the plurality of client apparatuses; and wherein the device further comprises:
    a consumable-replacement determining portion that determines whether the consumable is already replaced;
    a second setting portion that sets the request status information to an unordered state if the consumable-replacement determining portion determines that the consumable is already replaced;
    a second storing portion that stores stock information indicative of a number of the consumable in stock;
    an updating portion that updates the stock information if the consumable-replacement determining portion determines that the consumable is already replaced, and that updates the stock information in accordance with an ordered number of the consumable; and
    a third transmitting portion that, in accordance with a request from one of the plurality of client apparatuses, transmits the stock information to the one of the plurality of client apparatuses.

11. A network system comprising a plurality of client apparatuses and a device, each of which configured to communicate with one another and with a server via a network, each of the plurality of client apparatuses comprising:
    a status-information acquiring portion that acquires, from the device, status information indicative of status of the device;
    a requesting portion that makes a predetermined request to the server based on the status information acquired from the device by the status-information acquiring portion;
    a request-status-information acquiring portion that acquires, from the device, request status information indicative of whether the predetermined request is already made to the server or not;
    a determining portion that determines whether the predetermined request is already made to the server, based on the request status information acquired by the request-status-information acquiring portion;

a request controlling portion that instructs the requesting portion to make the predetermined request to the server without utilizing the device to make the predetermined request, if the determining portion determines that the predetermined request is not yet made, and instructs the requesting portion not to make the predetermined request to the server, if the determination portion determines that the predetermined request is already made; and an instructing portion that instructs the device to set the request status information to a requested state indicating that the predetermined request is already made to the server, if the request controlling portion instructs the requesting portion to make the predetermined request to the server without utilizing the device to make the predetermined request, the device comprising:

a storing portion that stores the request status information;

a transmitting portion that, in accordance with a request from the request-status-information acquiring portion of one of the plurality of client apparatuses, transmits the request status information stored in the storing portion to the one of the plurality of client apparatuses; and a setting portion that sets the request status information to a requested state indicating that the predetermined request is already made to the server, in accordance with an instruction from the instructing portion of the one of the plurality of client apparatuses.

12. A storage medium storing a set of program instructions executable on a client apparatus configured to communicate with a device and with a server via a network, the set of program instructions comprising:

acquiring, from the device, status information indicative of status of the device;

making a predetermined request to the server based on the status information acquired from the device in the acquiring step;

acquiring, from the device, request status information indicative of whether the predetermined request is already made to the server or not;

determining whether the predetermined request is already made to the server, based on the request status information;

determining that the predetermined request should be made to the server without utilizing the device to make the predetermined request, if the predetermined request is not yet made; and instructing the device to set the request status information to a requested state indicating that the predetermined request is already made to the server, if it is determined that the user registration request should be made to the server without utilizing the device to make the user registration request.

* * * * *